United States Patent
Marzotto et al.

(10) Patent No.: US 12,188,223 B2
(45) Date of Patent: Jan. 7, 2025

(54) CURTAIN WALL AND DRAINAGE CAVITY FOR CURTAIN WALL UNIT

(71) Applicant: Permasteelisa North America Corp., Mendota Heights, MN (US)

(72) Inventors: Michele Marzotto, Shakopee, MN (US); Derick Jason Koprek, Shakopee, MN (US)

(73) Assignee: Permasteelisa North America Corp., Mendota Heights, MN (US)

( * ) Notice: Subject to any disclaimer, the term of this patent is extended or adjusted under 35 U.S.C. 154(b) by 734 days.

(21) Appl. No.: 17/342,068

(22) Filed: Jun. 8, 2021

(65) Prior Publication Data

US 2022/0389706 A1    Dec. 8, 2022

(51) Int. Cl.
*E04B 1/68* (2006.01)
*E04B 2/96* (2006.01)
*F16J 15/10* (2006.01)

(52) U.S. Cl.
CPC ............ *E04B 1/6812* (2013.01); *E04B 2/965* (2013.01); *F16J 15/102* (2013.01)

(58) Field of Classification Search
CPC .......... E04B 1/6812; E04B 2/88; E04B 2/965; F16J 15/102
USPC .......................................................... 52/265
See application file for complete search history.

(56) References Cited

U.S. PATENT DOCUMENTS

| | | | | |
|---|---|---|---|---|
| 4,765,107 A * | 8/1988 | Ting | ...................... | E04B 1/6812 52/235 |
| 4,873,806 A * | 10/1989 | Jeschke | .................. | E04B 2/962 52/235 |
| 4,986,046 A * | 1/1991 | Mazzarantani | ........... | E06B 1/02 52/235 |
| 5,067,293 A * | 11/1991 | Reynolds | ................ | E04B 2/965 52/235 |
| 5,253,459 A * | 10/1993 | Parinas | ..................... | E04B 2/96 52/235 |
| 9,567,746 B1 * | 2/2017 | Barbulescu | ............ | H02G 3/388 |
| 10,213,962 B2 * | 2/2019 | Robinson | ................ | B29C 66/00 |
| 2004/0031220 A1 * | 2/2004 | Hocker | .................... | E04B 2/965 52/235 |
| 2006/0016137 A1 * | 1/2006 | Ferro | ...................... | E04B 2/965 52/235 |
| 2012/0210664 A1 * | 8/2012 | Lang | ....................... | E04B 2/965 52/741.4 |

(Continued)

FOREIGN PATENT DOCUMENTS

JP     2017-218784    * 12/2017   ............... E04B 2/90

OTHER PUBLICATIONS

English language abstract of JP 2017-218784 publishes Dec. 14, 2017.

*Primary Examiner* — Paola Agudelo
(74) *Attorney, Agent, or Firm* — DLA Piper LLP (US)

(57) ABSTRACT

An end seal member, which includes a contacting surface including a drainage cavity along the contacting surface. The end seal member also includes a seal material body including a central body protrusion projecting in a horizontal direction substantially orthogonal to the seal material body from an opposite face of the contacting surface. The end seal member also includes a first and second extending elements extending upward from the seal material body and a reinforcing metal plate within the seal material body. The contacting surface is substantially flat.

20 Claims, 13 Drawing Sheets

(56) References Cited

U.S. PATENT DOCUMENTS

| | | | |
|---|---|---|---|
| 2012/0326391 A1* | 12/2012 | Hirose | F16J 15/102 |
| | | | 277/637 |
| 2019/0136523 A1* | 5/2019 | Claeys | E04B 2/88 |
| 2019/0309513 A1* | 10/2019 | Privan | E06B 7/14 |
| 2020/0032509 A1* | 1/2020 | Claeys | E04B 2/967 |
| 2021/0032860 A1* | 2/2021 | Budd | E04B 2/965 |
| 2022/0290430 A1* | 9/2022 | Claeys | E04B 2/965 |

* cited by examiner

CURTAIN WALL AND DRAINAGE CAVITY FOR CURTAIN WALL UNIT

BACKGROUND

There are two distinct types of curtain walls—a stick or knock-down curtain wall system that is installed at a construction site by assembling, installing and glazing premachined framing members, and a unitized curtain wall system that utilizes factory assembled curtain wall units/frames (that includes glass panels) that are installed as units at the site. Unitized curtain wall units are sequentially attached to the building structure with an interlocking method. Unitized curtain wall units are generally fabricated with glass (and panels of various materials) infill panels at the factory, then transported to the site and mounted to the building structure.

Unitized curtain wall systems are typically based on one story high units with varying widths. The curtain wall units are generally comprised of an aluminum profile frame. Vertical framing members, called mullions, run from one floor to the next at each side of a unit. Horizontal framing members, called transoms, span between the vertical framing members. Several types of transoms are common in a typical curtain wall unit. The head transom occurs at the top of each unit and it typically contains a drainage surface called a gutter. The sill transom occurs at the bottom of each unit and it is connected to the head transom where the upper unit engages the lower unit. The gutter and sill configuration allows the use of a pressure equalization concept to ensure water drainage out of the curtain wall system and allows for air and water tightness during building movements. Internal gaskets help provide air and water tight integrity for the curtain wall system.

Integral to achieving air and water tightness, a splice serving as a joint sleeve connecting the units is field installed in the head transom at the joint between two adjacent units. It is necessary to seal the periphery and the connecting portion with a sealing agent such as caulking, which can be problematic because this operation is complicated and susceptible to specific field conditions (e.g., temperature (hot or cold), dust, rain, etc.). This process can prolong the installation time, which can be problematic.

SUMMARY

The present disclosure provides a curtain wall system that does not require a complicated joint sealing (splice) operation. The object of the present disclosure is to provide a curtain wall system that provides a barrier that prevents water and air from reaching the indoor area without additional field sealing.

DETAILED DESCRIPTION

Examples described herein are directed towards an end seal member, which includes a contacting surface having a drainage cavity along the contacting surface. The end seal member also includes a seal material body having a central body protrusion projecting in a horizontal direction substantially orthogonal to the seal material body from an opposite face of the contacting surface. The end seal member also includes first and second extending elements extending upward from the seal material body and a reinforcing metal plate within the seal material body. The contacting surface is substantially flat.

Figure 1:
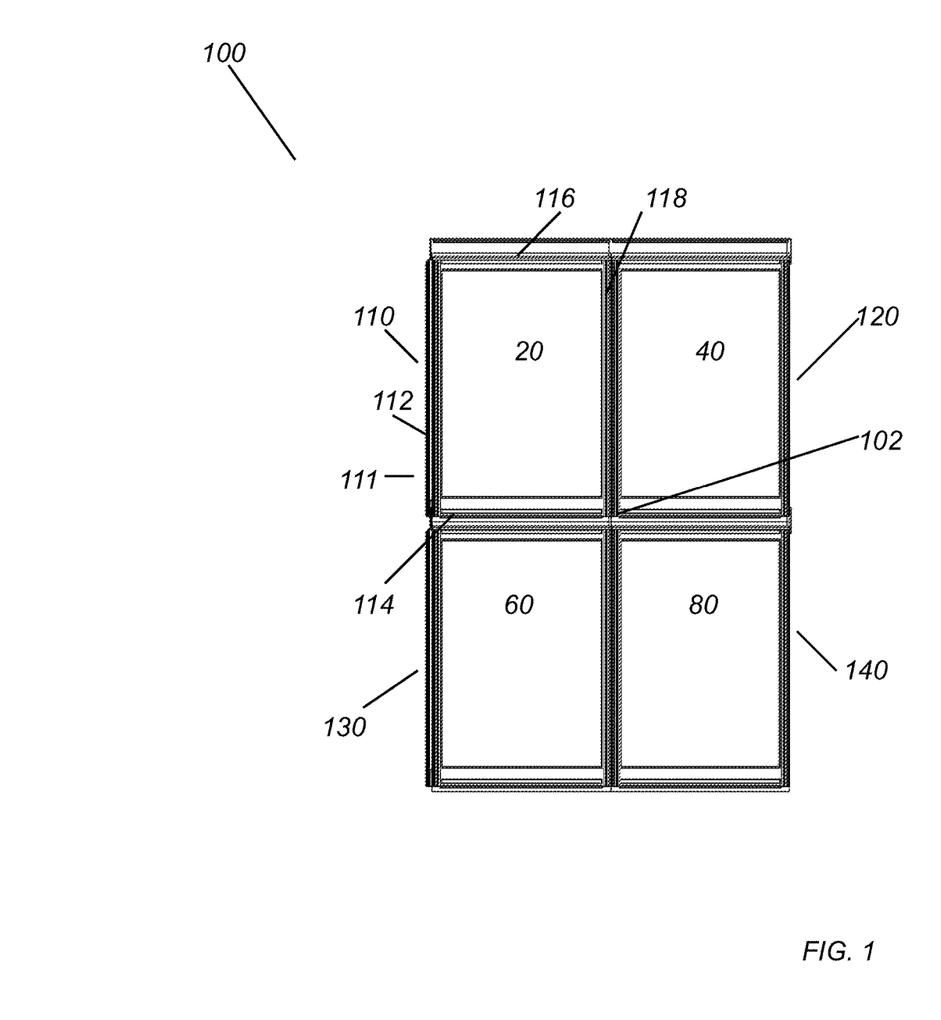
FIG. 1 illustrates an example curtain wall assembled in a four-way joint in which certain elements of the present disclosure may be implemented.

FIG. 1 illustrates an example curtain wall 100 assembled in a four-way joint 102 in which certain elements of the present disclosure may be implemented. The example curtain wall 100 is configured by arranging curtain wall units 110, 120, 130, 140 as disclosed herein. For example, the curtain wall 100 includes a first upper curtain wall unit 110, a second upper curtain wall unit 120, a first lower curtain wall unit 130, and a second lower curtain wall unit 140. The four-way joint 102 indicates a connecting portion of each corner portion where the four units adjoin.

The first upper curtain wall unit 110 includes a frame body 111 and a glass panel 20. The glass panel 20 can be configured as a single glass panel or a double glass panel. The frame body 111 may include a first lateral frame 112 and a second lateral frame 118. The frame body 111 may also include an upper frame 116 and a lower frame 114 connecting the first and second lateral frames 112 and 118. Each curtain wall unit may be similarly manufactured to include a frame body having first and second lateral frames and upper and lower frames connecting the first and second lateral frames. The frame body of the curtain wall units may be made of, for example, a metal member such as an aluminum alloy. Each of the frame bodies may include a glass panel, e.g., 40, 60, and 80.

Figure 2:
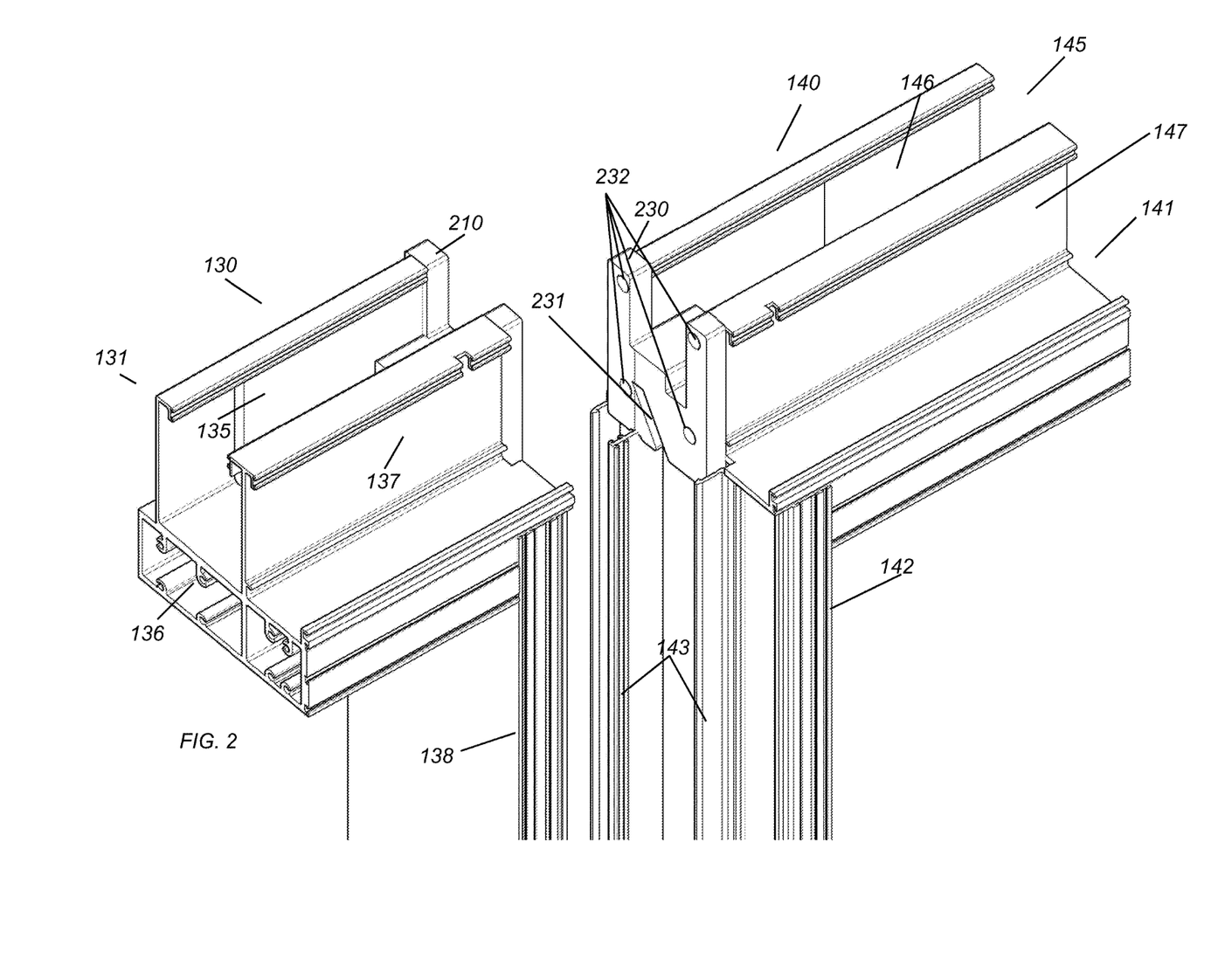
FIG. 2 is an isometric view of a mating of the first lower curtain wall unit and a second lower curtain wall unit of the example curtain wall, in accordance with an example of the disclosure.

FIG. 2 is an isometric view of a mating of the first lower curtain wall unit 130 and the second lower curtain wall unit 140 of the example curtain wall 100, in accordance with an example of the disclosure. The first lower curtain wall unit 130 includes a first end seal member 210 located at a mating face of the first lower curtain wall unit 130. The second lower curtain wall unit 140 includes a second end seal member 230 located at a mating face of the second lower curtain wall unit 140. The second end seal members 210 and 230 include drainage cavities 231, which is discussed in greater detail below.

The first lower curtain wall unit 130 may include a frame body 131 having a first vertical frame 138 located at the mating face of the first lower curtain wall unit 130. The second lower curtain wall unit 140 may include a frame body 141 having a first vertical frame 142 located at the mating face of the second lower curtain wall unit 140. The first vertical frame 142 may include side vertical walls (or extruded blades) 143.

The frame body 131 of the first lower curtain wall unit 130 also includes an upper frame 136. The upper frame 136 includes vertical mating walls 135 and 137. The vertical mating walls 135 and 137 may be substantially parallel and configured to receive a transom, separating the first lower curtain wall unit 130 from an identical curtain wall unit (e.g., the second upper curtain wall unit 110 in FIG. 1). The frame body 141 of the second lower curtain wall unit 140 may also include an upper frame 146. The upper frame 146 also includes vertical mating walls 145 and 147. The vertical mating walls 145 and 147 may be substantially parallel and configured to receive a transom, separating the second lower curtain wall unit 140 from an identical curtain wall unit (e.g., the first upper curtain wall unit 120 in FIG. 1).

Figure 3:
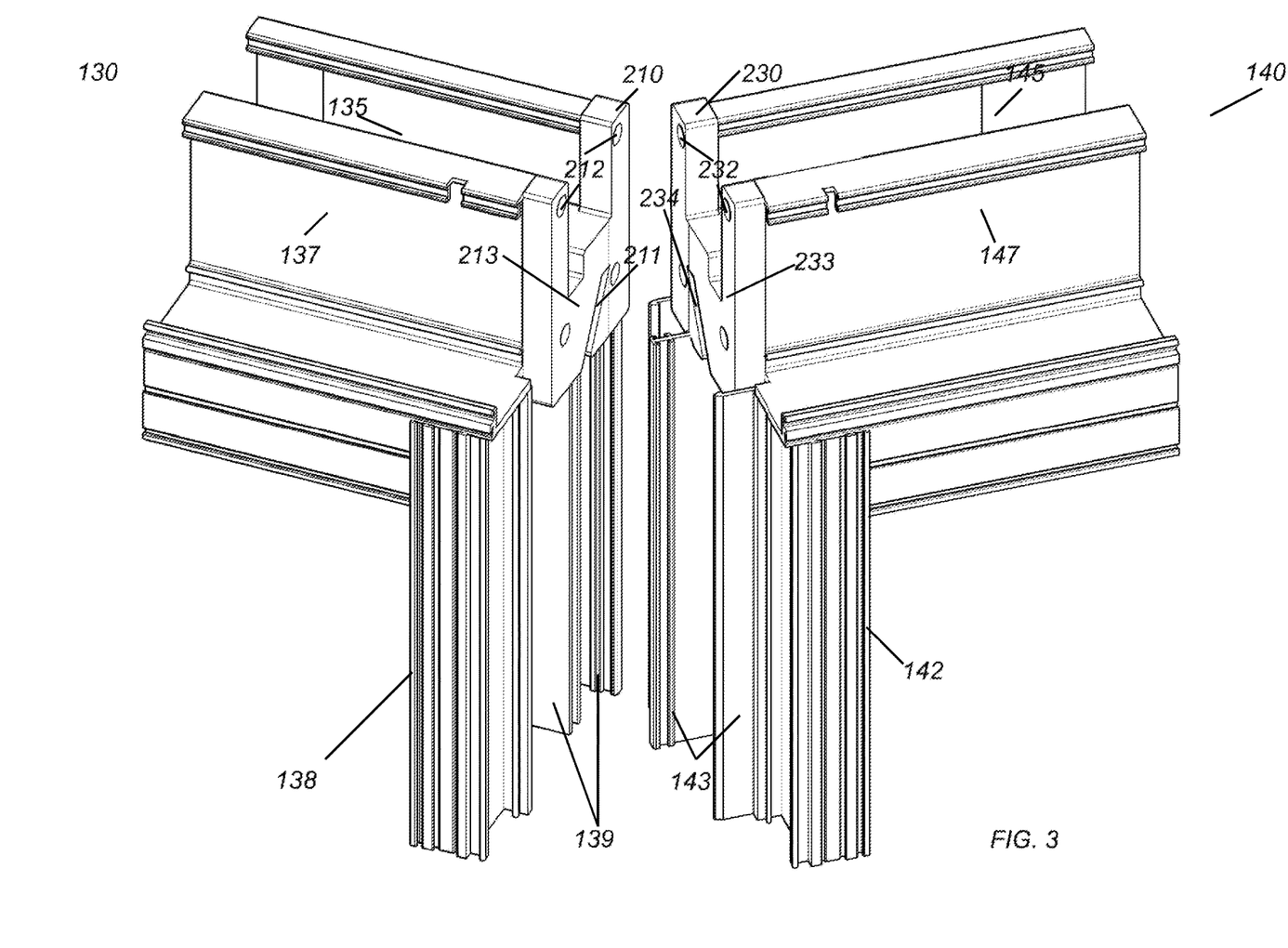
FIG. 3 is an isometric view of a mating of the first lower curtain wall unit and a second lower curtain wall unit of the example curtain wall, in accordance with an example of the disclosure.
Figure 4:
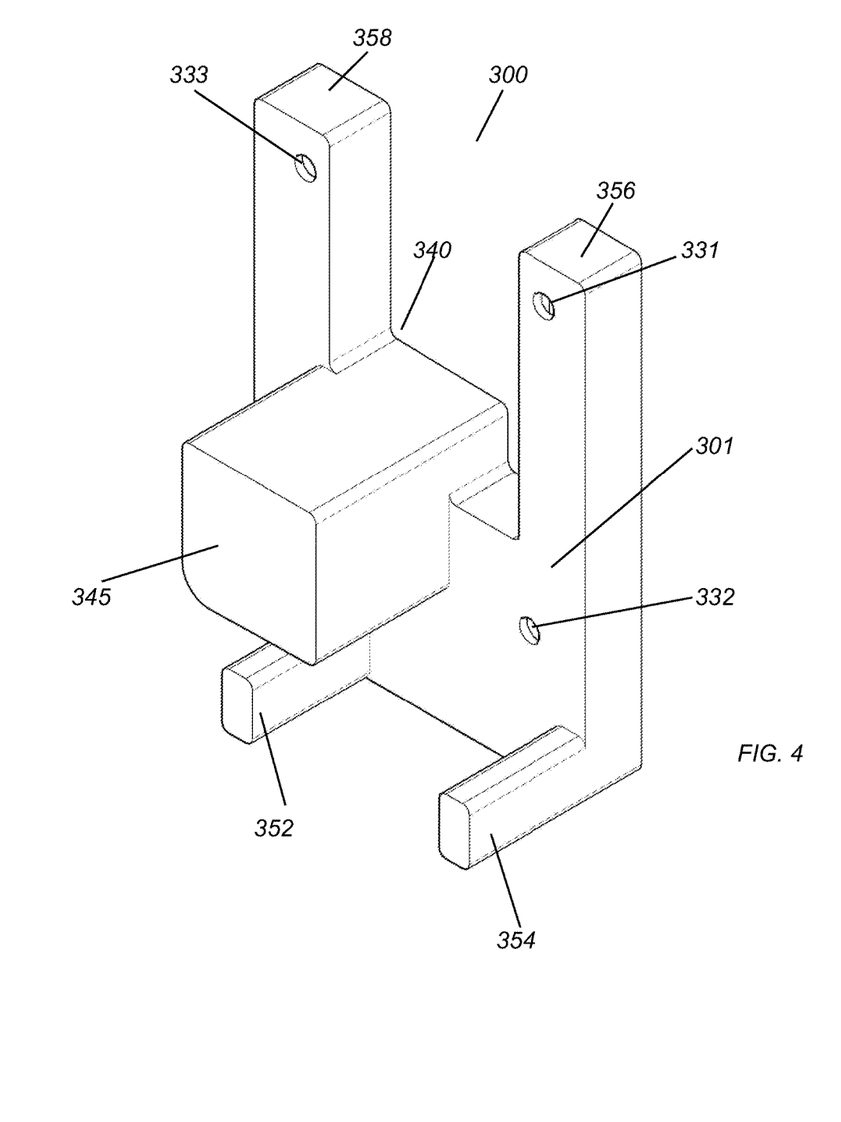
FIG. 4 is an isometric view of an end seal member of a curtain wall unit, in accordance with an example of the disclosure.
Figure 5:
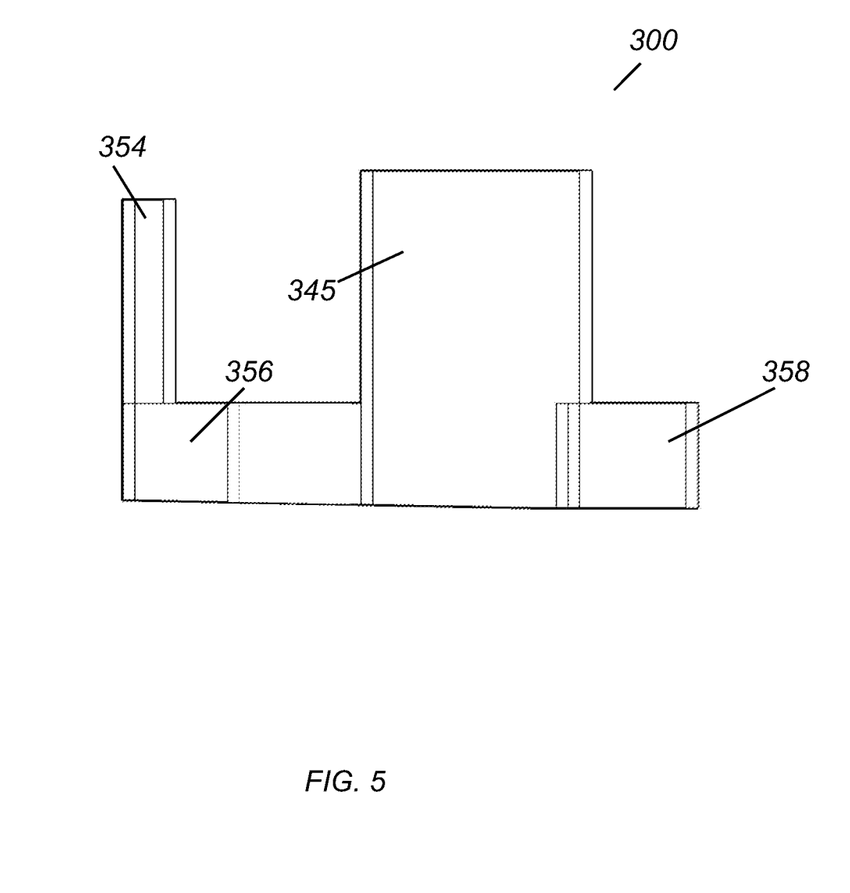
FIG. 5 is a top view of the end seal member of FIG. 4, in accordance with an example of the disclosure.
Figure 6:
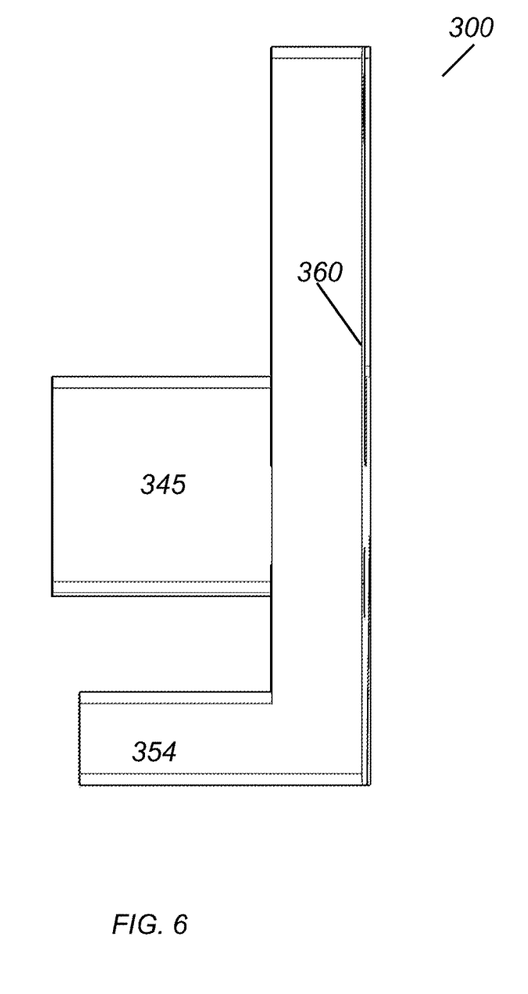
FIG. 6 is a front view of the end seal member of FIG. 4, in accordance with an example of the disclosure.

FIG. 3 is an isometric view of a mating of the first lower curtain wall unit 130 and second lower curtain wall unit 140 of the example curtain wall 100, in accordance with an example of the disclosure. The first end seal member 210 may be connected to the vertical mating walls 135 and 137 of the upper frame 136 by securing elements 212. The first end seal member 210 may be provided on the side vertical walls 135 and 137 of first vertical frame 138. The second end seal member 230 may be connected to the vertical mating walls 145 and 147 of the upper frame 146 by securing elements 232.

The first end seal member 210 may be provided on the side vertical walls 139 of first vertical frame 138. The second end seal member 230 may be provided on the side vertical walls 143 of first vertical frame 142. The first end seal member 210 may engage the second end seal member 230 during assembly of the curtain wall 100. The side vertical walls 139 of first vertical frame 138 and the side vertical walls 143 of first vertical frame 142 are configured to mate at their adjoining surface as the first end seal member 210 engages the second end seal member 230.

Specifically, the first end seal member 210 includes a contacting surface 213. The contacting surface 213 includes a drainage cavity 211. Similarly, the second end seal member 230 includes a contacting surface 233. The contacting surface 233 includes a drainage cavity 234. The contacting surface 213 and the contacting surface 233 are configured to adjoin, aligning the drainage cavity 211 of the first end seal member 210 and the drainage cavity 234 of the second end seal member 230. Once aligned, the drainage cavities 211, 234 collectively form a chamfered recess to prevent contamination of rainwater and frost damage.

In some examples, the first end seal member 210 and the second end seal member 230 may be formed of an elastic material. For example, the first end seal member 210 and the second end seal member 230 may be made up of foamed silicone, foamed resin, or synthetic rubber.

FIGS. 4-11 illustrate various views of an end seal member 300 (e.g., end seal member 210 or end seal member 230 of FIG. 3) of a curtain wall unit, in accordance with an example of the disclosure.

The end seal member 300 has a predetermined thickness and is formed in a substantially U-shaped seal material body 301. The end seal member 300 can also include a central body protrusion 345 projecting in a horizontal direction substantially orthogonal to the seal material body 301. The central body protrusion 345 extends from end seal member 300 from an opposite face of the contacting surface 340.

The end seal member 300 also includes a first extending element 358 extending upward from the seal material body 301. In some embodiments, the central body protrusion 345 can extend from a central location of the seal material body 301. In other embodiments, the central body protrusion 345 can extend from an off-centered location of the seal material body 301. For example, the central body protrusion 345 can be located adjacent to the first extending element 358.

The first extending element 358 includes an aperture 333 configured to receive a securing element (e.g., a screw, a fastener, etc.). The end seal member 300 also includes a second extending element 356 extending upward from the seal material body 301. The second extending element 356 includes an aperture 331 configured to receive a securing element (e.g., a screw, a fastener, etc.). The end seal member 300 also includes a first position protrusion 352 and a second position protrusion 354. The first position protrusion 352 may be located opposite the first extending element 358 in a vertical direction and extends substantially orthogonal to the seal material body 301. Similarly, the second position protrusion 354 may be located opposite of the second extending element 356 in a vertical direction and extends substantially orthogonal to the seal material body 301.

Figure 7:
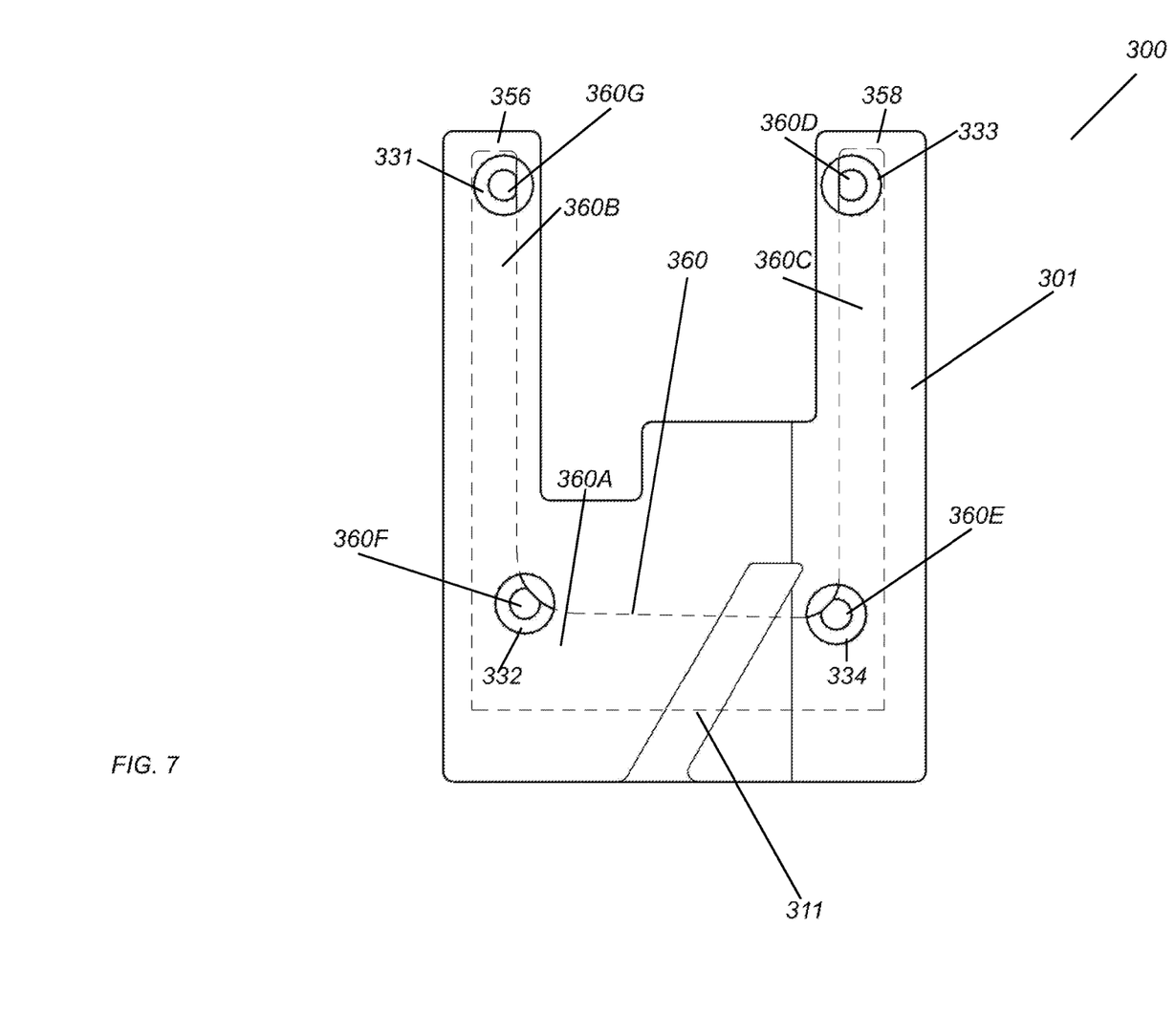
FIG. 7 is a side view of the end seal member of FIG. 4, in accordance with an example of the disclosure.

Referring to FIG. 7, the seal material body 301 of the end seal member 300 includes apertures 332 and 334. The aperture 334 is adjacent to the central body protrusion 345 (FIG. 6) of the end seal member 300. The apertures 331-334 are positioned about the end seal member 300 to secure the end seal member 300 to a curtain wall unit.

The end seal member 300 also includes a reinforcing metal plate 360 (shown dashed) within the seal material body 301. In some embodiments, the reinforcing metal plate 360 may have a predetermined thickness and may be substantially U-shaped. The reinforcing metal plate 360 has a main body 360A and a first protruding element 360B and a second protruding element 360C. The main body 360A may include two apertures 360E and 360F. While two apertures are illustrated here, the main body 360A may include one or more apertures.

The first protruding element 360B may extend upward from the main body 360A of the metal plate 360, adjacent to the first extending element 356. The first protruding element 360B includes an aperture 360G. The second protruding element 360C may extend upward from the main body 360A of the reinforcing metal plate 360, adjacent to the second extending element 358. The second protruding element 360C includes an aperture 360D.

The first protruding element 360B extends into the aperture 331 such that the aperture 360G is aligned with the aperture 331. A securing element may be fastened through aperture 331 and aperture 360G of the reinforcing metal plate 360.

The second protruding element 360C extends into the aperture 333 that the aperture 360D is aligned with the aperture 333. A securing element is fastened through aperture 333 and aperture 360D of the reinforcing metal plate 360.

Moreover, the main body 360A includes flanges that extend into the apertures 332 and 334 such that the aperture 360E is aligned with the aperture 334 and aperture 360F is aligned with the aperture 332. A securing element may be fastened through aperture 334 and aperture 360E of the reinforcing metal plate 360. A securing element may be fastened through aperture 332 and aperture 360F of the reinforcing metal plate 360.

The reinforcing metal plate 360 may be positioned at or near the contacting surface 340, within the seal material body 301. Specifically, one surface of the reinforcing metal plate 360 forms a close contact surface with the contacting surface 340. Both surfaces are relatively flat, as indicated in FIGS. 4-11.

Figure 8:
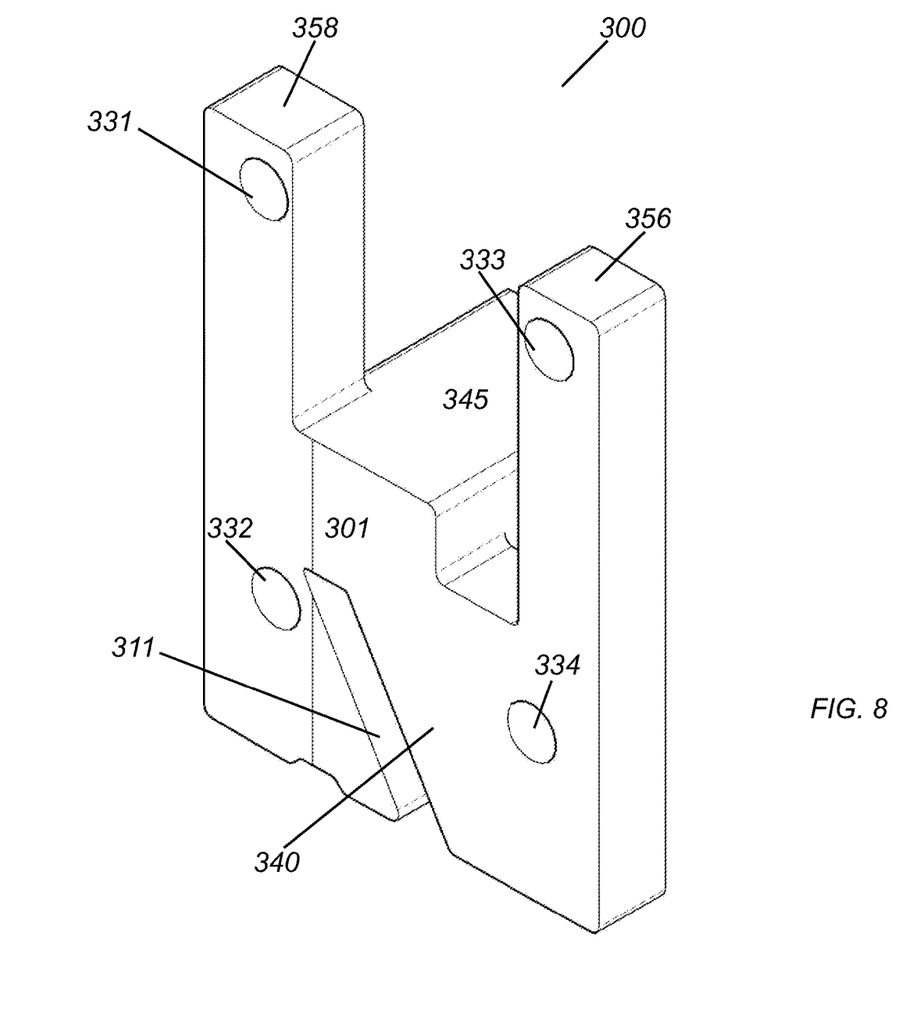
FIG. 8 is an isometric view of an end seal member illustrating the drainage cavity, in accordance with an example of the disclosure.
Figure 9:
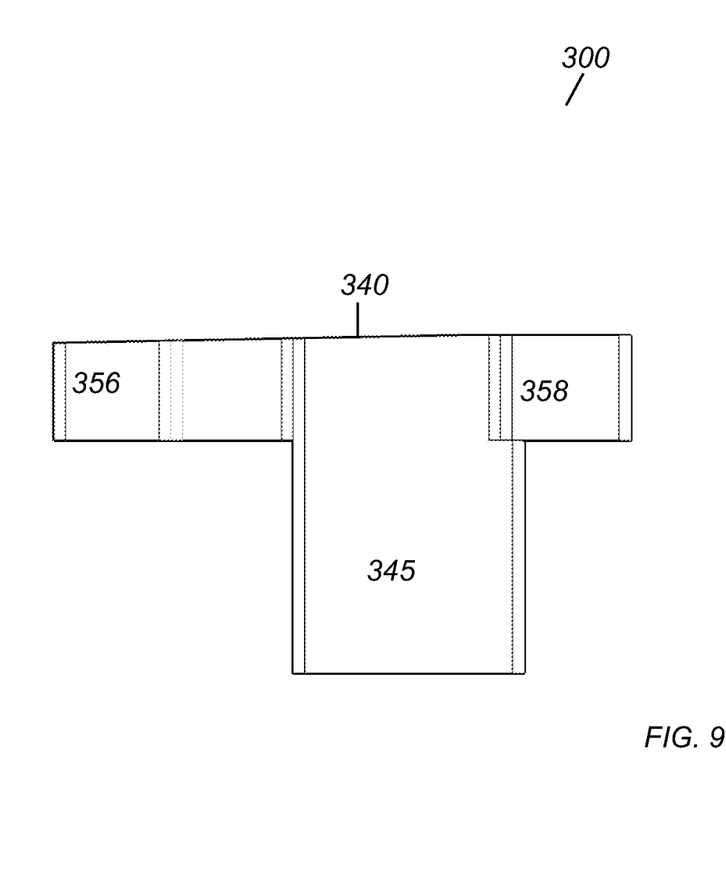
FIG. 9 is a top view of the end seal member of FIG. 8 illustrating the drainage cavity, in accordance with an example of the disclosure.
Figure 10:
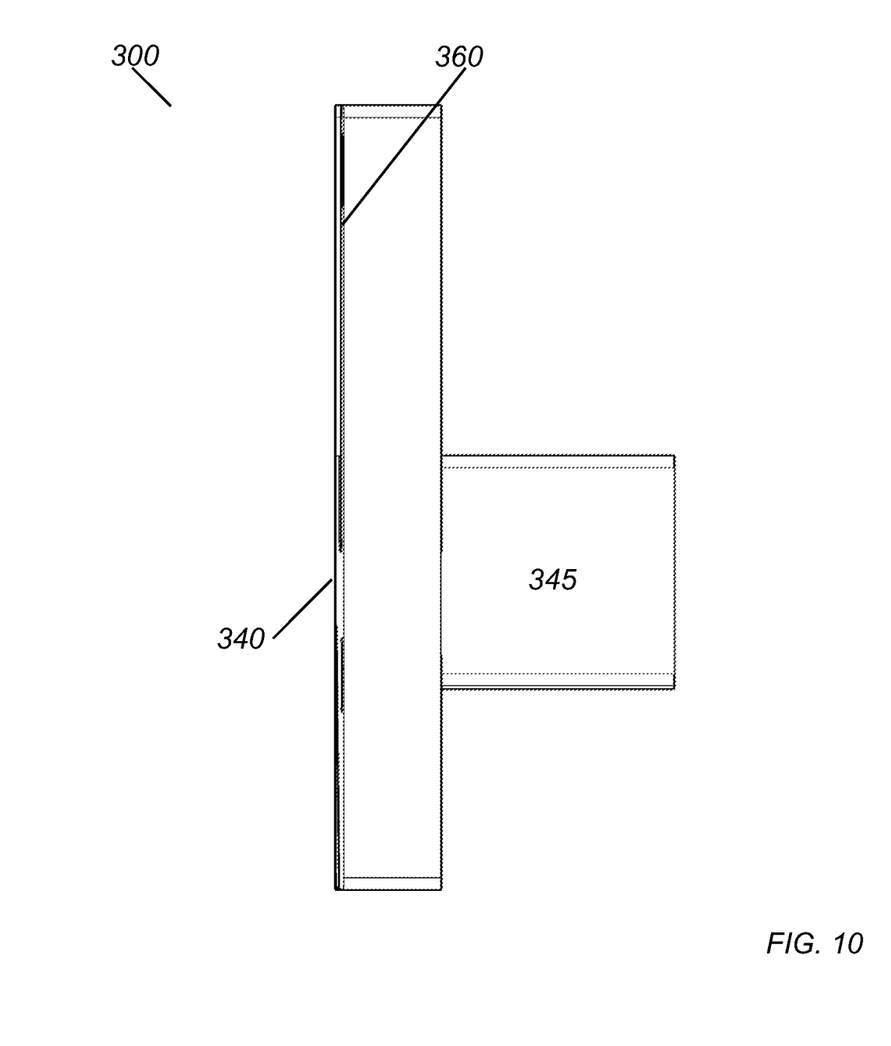
FIG. 10 is a front view of the end seal member of FIG. 8, in accordance with an example of the disclosure.
Figure 11:
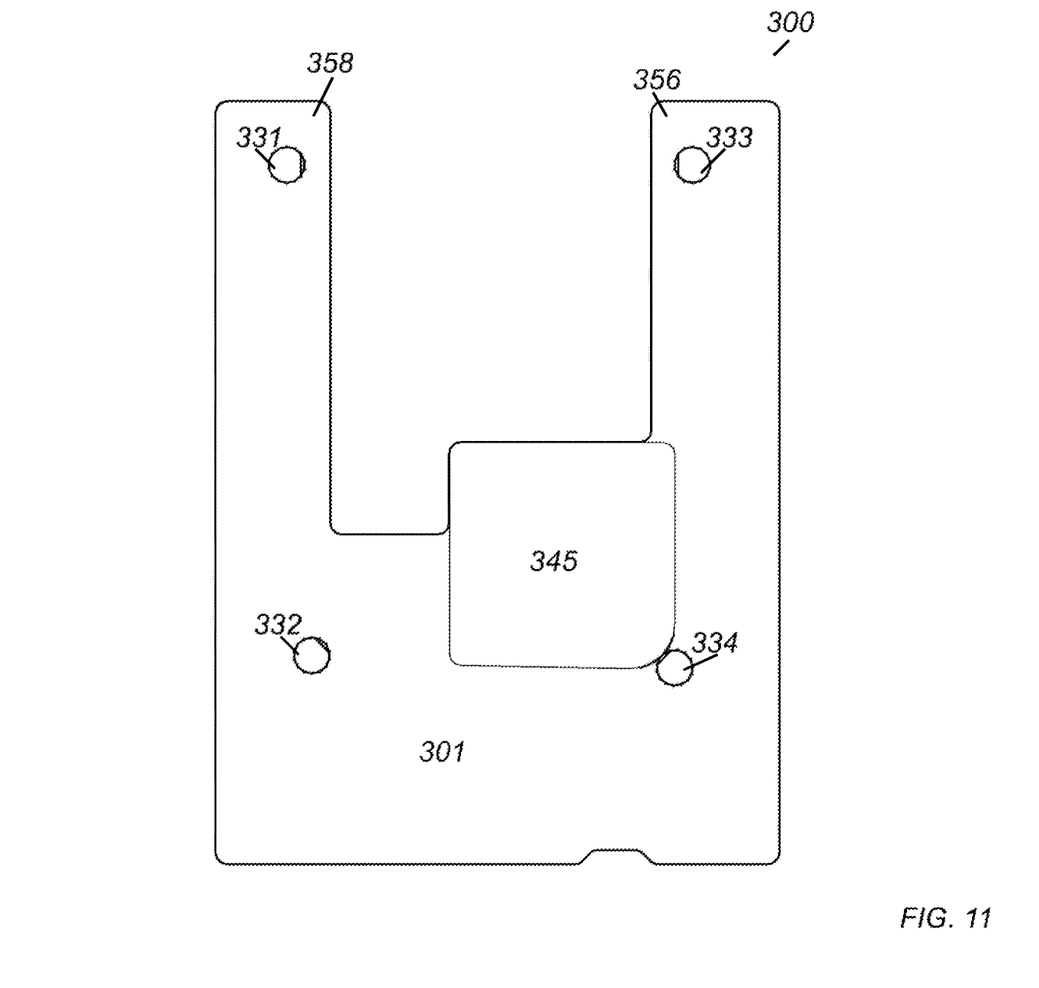
FIG. 11 is a side view of the end seal member of FIG. 8, in accordance with an example of the disclosure.

Referring specifically to FIG. 8, the end seal member 300 includes a drainage cavity 311. The drainage cavity 311 is a void of the foamed silicone, foamed resin, or synthetic rubber material of the end seal member 300. In some embodiments, the drainage cavity 311 exposes a portion of the reinforcing metal plate 360, specifically, the main body 360A. In alternative embodiments, the metal plate 360 may include a void identical to the drainage cavity 311.

Figure 12:
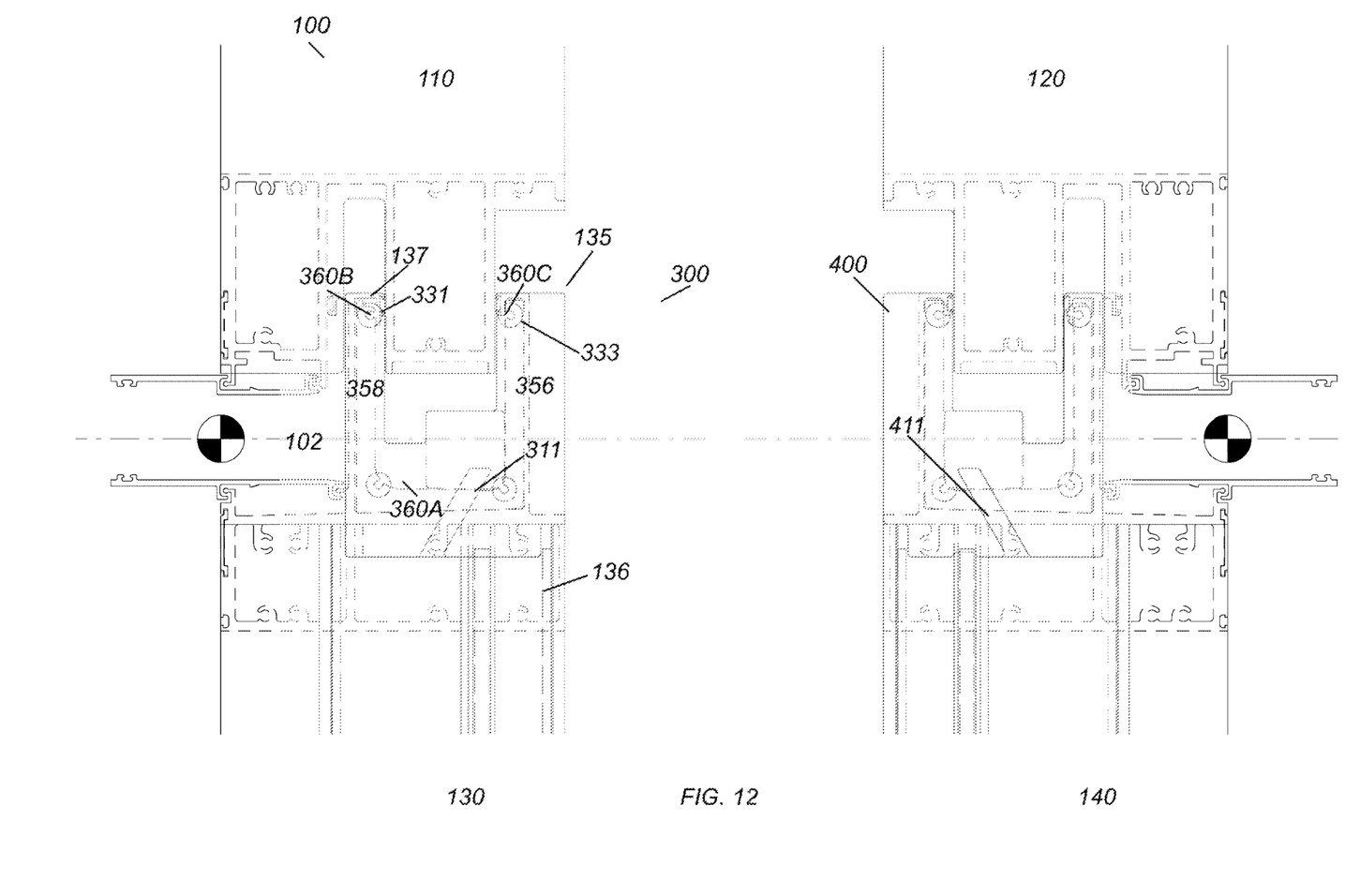
FIG. 12 is a side view of the mating of the first upper curtain wall unit and the first lower curtain wall unit, in accordance with an example of the disclosure.

FIG. 12 is a side view of the mating of the first upper curtain wall unit 110 and the first lower curtain wall unit 130, in accordance with an example of the disclosure. The first extending element 358 and the second extending element 356 are formed as extensions of the vertical mating walls 137 and 135, respectively, of unit 130. The reinforcing metal plate 360 of the end seal member 300 may be secured to the vertical mating walls 137 and 135. For example, a securing element may secure the reinforcing metal plate 360 of the end seal member 300 to the vertical mating wall 137 of the upper frame 136 via the aperture 331. Moreover, a securing element may secure the reinforcing metal plate 360 of the end seal member 300 to the vertical mating wall 135 of the upper frame 136 via the aperture 333. The first upper curtain wall unit 110 comes into contact with the vertical mating walls 137 and 135 of the first lower curtain wall unit 130. The apertures 331 and 333 align with receiving elements of the first upper curtain wall unit 110, such that securing elements formed in the end seal member 300 fix the reinforcing metal plate 360 of the end seal member 300 to the first upper curtain wall unit 110.

When the curtain wall 100 is assembled, the curtain wall units 110 and 130 are assembled in the up-down direction at the four-way joint 102. Similarly, the curtain wall units 120 and 140 are assembled in the up-down direction at the four-way joint 102. The end seal member 300 may be positioned at the upper end corner where the first lower curtain wall unit 130 and the vertical mating walls 137 and 135 of the first lower curtain wall unit 130 intersect at the four-way joint 102. The end seal member 300 is attached to the extended end of the upper frame 136 and vertical mating walls 137 and 135 of the first lower curtain wall unit 130. Similarly, the second end seal member 400 is attached to the vertical mating walls 145 and 147 of the second lower curtain wall unit 140. The upper frame 146 of the second lower curtain wall unit 140 at the upper end corner where the upper frame 146 and the vertical frame 142 of the second lower curtain wall unit 140 intersect at the four-way joint 102.

Figure 13:
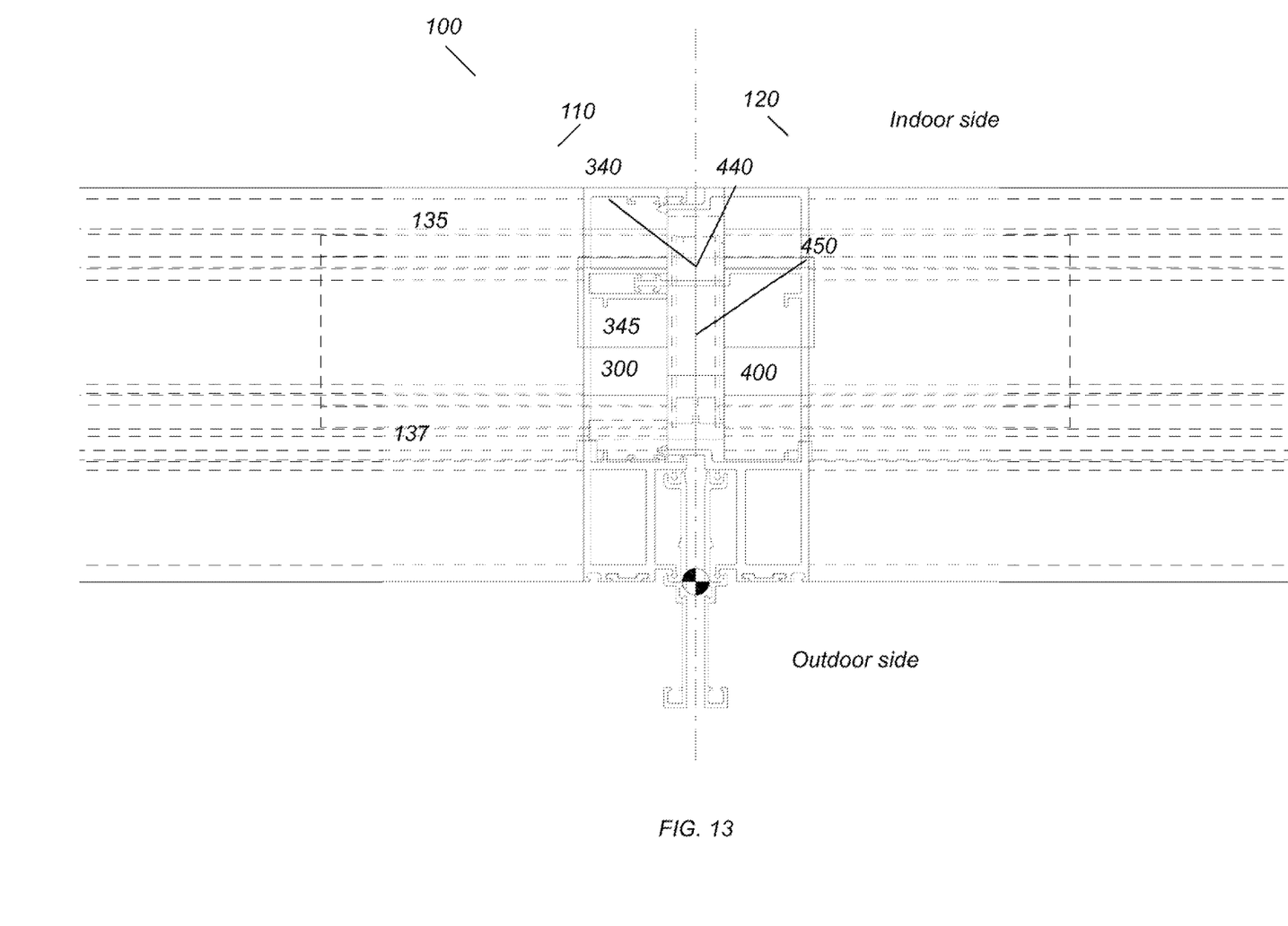
FIG. 13 is a top view of the mating of the first upper curtain wall unit and the second upper curtain wall unit, in accordance with an example of the disclosure.

FIG. 13 is a top view of the mating of the first upper curtain wall unit 110 and the second upper curtain wall unit 120, in accordance with an example of the disclosure.

The contact surface 340 of the first upper curtain wall unit 110 and the contact surface 440 of the second upper curtain wall unit 120 are pressed together. Then, the first drainage cavity 311 (FIG. 12) of the end seal member 300 and the second drainage cavity 411 (FIG. 12) of the second end seal member 400 are fitted together to create a chamfered recess 450 to prevent contamination of rainwater and frost damage, in a close contact state.

The chamfered recess created by the first drainage cavity 311 and the second drainage cavity 411 is the bottom of a recessed fitting portion, so that rainwater or the like tends to be easily collected. There is a tendency for water to ooze between the contact surfaces 340 and 440. The water that permeates through a slight gap on the outdoor side of the first upper curtain wall unit 110 and the second upper curtain wall unit 120 flows between the contact surfaces 340 and 440 and soaks into the indoor side. However, the chamfered recess guides the liquid down and away from the indoor side. As a result, the liquid is prevented from flowing into the indoor side and dropped downward, and returned to the outdoor side through a channeling.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. An end seal for a curtain wall, the end seal comprising:
   a first end seal member for a first curtain wall unit and comprising:
      a first contacting surface including a first drainage cavity along the first contacting surface;
      a seal material body including a central body protrusion projecting in a horizontal direction substantially orthogonal to the seal material body from an opposite face of the first contacting surface;
      a first extending element extending upward from the seal material body;
      a second extending element extending upward from the seal material body; and
      a reinforcing metal plate within the seal material body;
   a second end seal member for a second curtain wall unit and comprising a second contacting surface including a second drainage cavity along the second contacting surface; and
   the first contacting surface adjoining the second contacting surface thereby aligning the first drainage cavity and the second drainage cavity to form a chamfered recess.

2. The end seal of claim 1, wherein at least one of the first end seal member and the second end seal member is made up of foamed silicone, foamed resin, or synthetic rubber.

3. The end seal of claim 1, wherein at least one of the first end seal member and the second end seal member has a predetermined thickness and is formed in a U-shaped seal material body.

4. The end seal of claim 1, wherein the central body protrusion extends from an off-centered location of the seal material body and is located adjacent to the first extending element.

5. The end seal of claim 1, wherein the first end seal member comprises a first position protrusion;
wherein the first position protrusion is located opposite of the first extending element in a horizontal direction substantially orthogonal to the seal material body.

6. The end seal of claim 1, wherein the first end seal member comprises a second position protrusion;
wherein the second position protrusion is located opposite of the second extending element in a horizontal direction substantially orthogonal to the seal material body.

7. The end seal of claim 1, wherein the reinforcing metal plate includes a predetermined thickness and is U-shaped.

8. The end seal of claim 7, wherein the reinforcing metal plate includes a main body, a first protruding element and a second protruding element.

9. The end seal of claim 8, wherein the first protruding element extends upward from the main body of the reinforcing metal plate, adjacent to the first extending element.

10. The end seal of claim 8, wherein the second protruding element extends upward from the main body of the reinforcing metal plate, adjacent to the second extending element.

11. The end seal of claim 8, wherein the first extending element includes an aperture configured to receive a securing element;
wherein the first protruding element extends into the aperture such that the securing element is positioned through the aperture and an aperture of the reinforcing metal plate.

12. The end seal of claim 8, wherein the second extending element includes an aperture configured to receive a securing element;
wherein the second protruding element extends into the aperture such that the securing element is positioned through the aperture and an aperture of the reinforcing metal plate.

13. The end seal of claim 1, the reinforcing metal plate is positioned at or near the first contacting surface, within the seal material body.

14. The end seal of claim 1, wherein at least one of the first contacting surface and the second contacting surface is substantially flat.

15. The end seal of claim 1, wherein the reinforcing metal plate includes a void substantially identical to the first drainage cavity.

16. A curtain wall comprising:
a first lower curtain wall unit including a first end seal member located at a mating face of the first lower curtain wall unit;
the first end seal member comprising:
a first contacting surface including a first drainage cavity along the first contacting surface;
a seal material body including a central body protrusion projecting in a horizontal direction substantially orthogonal to the seal material body from an opposite face of the first contacting surface;
a first extending element extending upward from the seal material body;
a second extending element extending upward from the seal material body; and
a reinforcing metal plate within the seal material body;
a second lower curtain wall unit including a second end seal member located at a mating face of the second lower curtain wall unit;
the second end seal member comprising a second contacting surface including a second drainage cavity along the second contacting surface; and
the first contacting surface adjoining the second contacting surface thereby aligning the first drainage cavity and the second drainage cavity to form a chamfered recess.

17. The curtain wall of claim 16, wherein the reinforcing metal plate includes a predetermined thickness and is U-shaped,
wherein the reinforcing metal plate includes a main body, a first protruding element and a second protruding element.

18. The curtain wall of claim 17, wherein the first protruding element extends upward from the main body of the reinforcing metal plate, adjacent to the first extending element.

19. The curtain wall of claim 17, wherein the second protruding element extends upward from the main body of the reinforcing metal plate, adjacent to the second extending element.

20. The curtain wall of claim 16, wherein at least one of the first contacting surface and the second contacting surface is substantially flat.

* * * * *